Oct. 1, 1929.   H. J. MURPHY   1,729,960
LUBRICATING APPARATUS
Filed Nov. 18, 1924
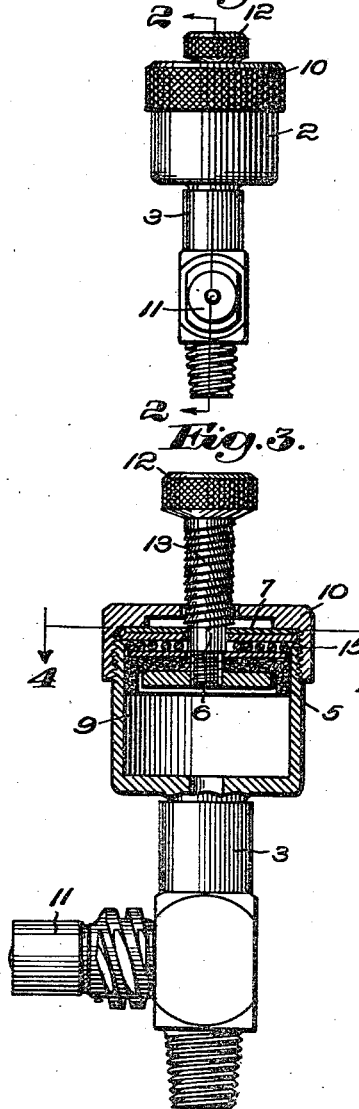
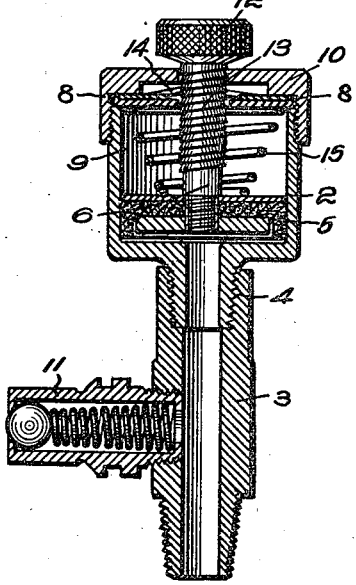
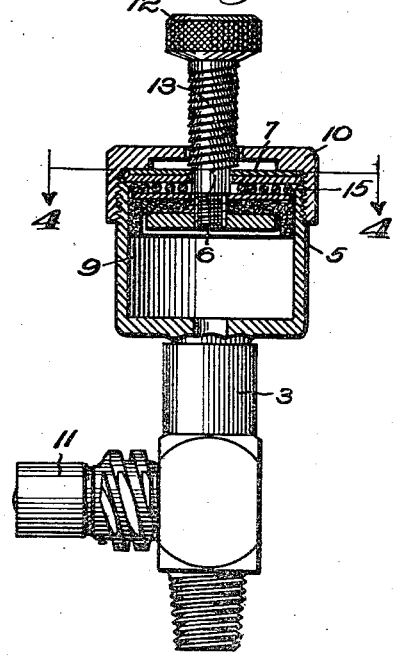
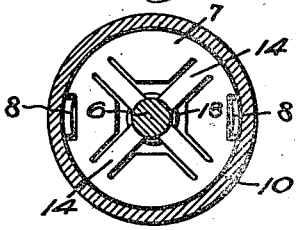
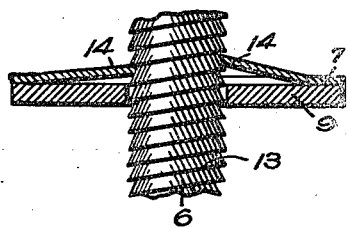
Inventor:
Howard J. Murphy Patented Oct. 1, 1929

1,729,960

UNITED STATES PATENT OFFICE

HOWARD J. MURPHY, OF READING, MASSACHUSETTS, ASSIGNOR, BY MESNE ASSIGNMENTS, TO ALEMITE CORPORATION, OF CHICAGO, ILLINOIS, A CORPORATION OF DELAWARE

LUBRICATING APPARATUS

Application filed November 18, 1924. Serial No. 750,606.

This invention aims to provide improvements in lubricating apparatus and more particularly, though not exclusively, in lubricant supply cups.

In the drawings, which illustrate a preferred embodiment of my invention:—

Figure 1 is an elevation view of a lubricant supply cup;

Fig. 2 is an enlarged section on the line 2—2 of Fig. 1, being partly in elevation and showing the parts as they appear when the cup is empty;

Fig. 3 is a section similar to Fig. 2, showing the relation of the parts when the cup is filled with lubricant;

Fig. 4 is a section on the line 4—4 of Fig. 3; and

Fig. 5 is an enlarged detail section, partly in elevation, of a portion of the stem and the means for gripping the stem, Referring to the drawings, I have shown a lubricant supply cup which is provided with means by which the lubricant-expelling piston may be quickly and easily shifted to a position to permit filling the cup with lubricant and which provides for forcing lubricant from the cup to the bearing when needed.

The supply cup, as illustrated, presents a body part or reservoir 2 secured to a nipple-carrying part 3 by threads 4 which are engaged in the tapped hole in one end of the part 3. Cooperating with the body part 2, I have shown (Figs. 2 and 3) a lubricant-expelling piston 5 connected to a stem 6 which, as illustrated, is exteriorly threaded for engagement with a relatively thin nut 7. The nut 7 is held in place by two tongues 8, 8 located on a washer 9 held between the body part 1 and the head 10, which is threadedly connected to the body part 2.

A lubricant-receiving nipple 11 is shown secured to the nipple-carrying part 3 at a right angle relative thereto and presents the male element of a coupling for connection with a source of lubricant under pressure so that the lubricant may be supplied through the nipple and nipple-carrying part to the reservoir 2 to move the piston to the position shown in Fig. 3 or to fill the reservoir if the piston has been manually moved to that position.

The stem 6 extends through an aperture in the head 10 and presents a knob 12 for manual operation of the piston. The stem, as illustrated, also presents a ratchet-shaped thread 13 which is engaged by the resilient pawl-like fingers 14 of the nut 7 to maintain the piston in any desired position. Thus the piston may be moved toward the head 10 by pressure of the lubricant, if the bearing is tight, or by pulling upwardly upon the knob 12. Although a spring 15 is interposed between the washer 9 and the piston 5, the piston cannot discharge lubricant from the body part 2 except by turning the knob 12, because the resilient fingers 14 are back-supported by the washer 9 and cannot flex in a downward direction to permit the stem to slide by. Thus the lubricant, such for instance as grease, will be retained in the body part 2 and can only be forced to the part to be lubricated by turning the knob 12 to screw the thread 13 through the nut 7, thereby moving the piston downwardly to expel lubricant at a relatively slow rate of speed.

While I have shown and described a preferred form of my invention, it will be understood that my invention is best defined in the following claims.

I claim:

1. A lubricant supply cup having a body part for attachment to a part to be lubricated, a lubricant-expelling part for forcing lubricant from said body part, a threaded stem carried by said lubricant-expelling part and resilient means engaging in the threads of said stem and adapted to flex upwardly to permit quick sliding movement of said lubricant-expelling part relative to said body part when filling said cup with lubricant while permitting expulsion of lubricant from said body part by rotation of said stem relative to said body part.

2. A lubricant supply cup having a body part for attachment to a part to be lubricated, a lubricant-expelling part presenting a threaded stem, resilient thread-engaging means adapted to flex in one direction to permit quick sliding movement of said expelling part in one direction and means for preventing flexing movement of said thread-engaging means in the opposite direction while permitting lubricant-expelling movement of said lubricant-expelling part by turning said threaded stem relative to said thread-engaging means, thereby to force lubricant from said body part at a relatively slow rate of speed.

3. A lubricant supply cup having a supply reservoir, a lubricant-receiving nipple through which lubricant is supplied to said reservoir, a piston for forcing lubricant from said reservoir, a threaded stem secured to said piston, a knob presented at the top of said reservoir by said stem for manual operation of said piston, resilient thread-engaging jaw means permitting sliding movement of said piston relative to said reservoir when lubricant is being supplied thereto, and means back supporting said jaw means to prevent sliding movement of said piston relative to said reservoir, when lubricant is being expelled therefrom while permitting manual rotation of said knob to screw said stem through said jaw means.

4. A lubricant supply cup having a supply reservoir, a lubricant-receiving nipple through which lubricant is supplied to said reservoir, a piston for forcing lubricant from said reservoir, a stem secured to said piston and presenting a ratchet-like thread and a relatively thin nut at the top of said reservoir, said nut presenting a plurality of resilient pawl-like fingers for engagement with said thread, said fingers yieldable in an upward direction to permit quick axial movement of said piston when said reservoir is being filled with lubricant and said fingers supported at the under sides thereof to prevent axial movement of said piston in lubricant expelling direction except by manually turning said stem relative to said cup, thereby to force lubricant from said reservoir at a relatively slow rate of speed.

5. A lubricant supply cup having a body part secured to a lubricant-receiving nipple-carrying part, a spring-pressed lubricant-expelling piston in said body part, a stem secured to said piston and extending through the removable head of said body part, a nut-like part fixed relative to said body part presenting resilient fingers for cooperation with a ratchet-like thread on said stem to permit quick sliding movement of said piston for filling said body part, while preventing discharge of lubricant by said piston except by manual rotation of said stem relative to said resilient means.

In testimony whereof, I have signed my name to this specification.

HOWARD J. MURPHY.